3,133,127
POLYMERIZATION PROCESS
Robert Y. Heisler, Wappingers Falls, Howard V. Hess, Glenham, and George W. Eckert, Wappingers Falls, N.Y., assignors to Texaco Inc., New York, N.Y., a corporation of Delaware
No Drawing. Filed Nov. 10, 1961, Ser. No. 151,448
3 Claims. (Cl. 260—683.15)

The present invention relates to a polymerization process and, more particularly, to a method for polymerizing propylene to produce a product having a substantial proportion of propylene dimers.

Propylene dimers have a wide range of uses. For example, they may be used, as such, for a fuel or fuel component or they may be hydrogenated to produce an improved fuel. These dimers may also be used as chemical intermediates for the production of a large number of compounds. A particularly significant use is for the synthesis of isoprene which in turn is used in the manufacture of synthetic rubber. The total use is sufficiently large to make the preparation of the dimer commercially important.

It is known to react propylene in the presence of a polymerization catalyst to produce dimers, trimers and higher olefinic polymers of propylene. Generally, these methods produce a complex product mixture that is difficult and expensive to resolve to its individual components. Another drawback to the known processes as far as propylene dimer is concerned is the fact that such processes generally produce a relatively small proportion of the dimer.

A method has now been discovered for polymerizing propylene in such a way that a relatively high concentration of propylene dimer is produced in the polymer product. This dimer can be economically separated and effectively employed for any of the above-noted uses.

In accordance with this process, a mixture of propylene and a low molecular weight fatty acid having from 2 to 4 carbon atoms are passed over a catalyst consisting essentially of silica and magnesia in the range of proportions respectively from 7:1 to 2:1 at an elevated temperature and pressure to produce propylene polymers having a substantial proportion of propylene dimers. The polymer product will consist of at least 45% and generally about 50% of the propylene dimer.

Essential features of this process are the employment of a fatty acid and the proportions of the fatty acid reacted in relation to the propylene reactant. Generally, a propylene to fatty acid ratio in the range of 10:1 to 1:1 can be employed with proportions in the range of 4:1 to 3:2 being highly preferred.

Effective fatty acids which can be employed in this process are the lower molecular weight fatty acids having from 2 to 4 carbon atoms. These acids have the formula RCOOH in which R is an alkyl radical having 1 to 3 carbon atoms. Specific fatty acids which are suitable are acetic, propionic and butyric acid with acetic being particularly preferred. A preferred reaction is conducted with proportions of propylene to acetic acid of about 2:1.

This reaction is effected in the broad temperature range of 600° to 850° F. with the preferred reaction temperature range being from about 700° to 800° F. The reaction is also conducted under an elevated pressure generally within the range of 50 to 250 p.s.i.g., with the range from about 100 to 200 p.s.i.g. being preferred. In general, the temperatures and pressures employed are similar to those employed in conventional polymerization processes.

It is essential that the reaction be conducted in the presence of a silica-magnesia catalyst. The silica-magnesia catalyst can be prepared over the range of proportions from 7:1 to 2:1 although a more effective and highly preferred catalyst is one consisting of silica and magnesia in the proportions from about 5:1 to 3:1.

This reaction can be conducted as a batch or a continuous process depending on the circumstances. When conducted as a continuous process, the reactants are passed through a fixed bed of the silica-magnesia catalyst under the temperature and pressure conditions indicated above to effect the polymerization of propylene. An effective space velocity for the reaction mixture over the catalyst in the continuous reaction is a space velocity in the range of 3 to 0.1 volumes of liquid feed per bulk volume of catalyst per hour with the preferred rate being in the range of 1.2 to 0.3 v./v./hr.

Under the foregoing conditions, propylene is polymerized to a mixture of polymers containing a substantial proportion of a $C_6$ branched chain olefins. The following example illustrates the practice of this invention.

*Example*

A reaction mixture was prepared consisting of propylene and acetic acid in the proportion of 2 moles of propylene to one mole of acetic acid. The reaction was conducted over a fixed bed of a commercially available pelleted silica-magnesia cracking catalyst consisting of 67.4 parts of silica per 24.3 parts of magnesia at a temperature of 750° F. under a pressure of 175 p.s.i.g. The space velocity employed was 0.5 v./v./hr.

285 grams of product were recovered from the foregoing reaction. The product was fractionated to separate the dimers from the higher boiling polymers. A recovery of 50% of a $C_6$ polymer boiling under 160° F. was realized.

The clear R.O.N. value of this $C_6$ product was determined to be 104.7. On blending with tetraethyl lead in the proportin of 3 cc. per gallon, this fuel had an R.O.N. value of 109.3. The leaded fuel also had an M.O.N. value of 95.4.

A series of runs were conducted wherein propylene was polymerized over a silica-magnesia catalyst in the absence of acetic acid. These runs were conducted at temperatures from 675 to 750° F. and at pressures from 500 to 2000 p.s.i.g. Charge rates from 90 to 189 grams/hours were employed.

In the absence of a fatty acid, the reaction was ineffective. Half of the runs conducted produced no propylene dimer at all while the remainder of the runs produced minor to insignificant amounts of the dimer.

A series of runs were conducted in which propylene was polymerized in the absence of a fatty acid but over a silica-magnesia catalyst which had been treated with acetic acid. These runs were conducted at 750° F. at pressures from 175 to 1000 p.s.i.g. No propylene dimer was produced.

Another series of runs were conducted in which propylene was polymerized in the presence of acetic acid employing a propylene to acetic acid mole ratio of 72:1. These runs were conducted at about 750° F. under pressures from 500 to 2000 p.s.i.g.

The maximum percentage of propylene dimer produced in any of these runs was 5% indicating that these conditions are not suitable for producing large proportions of the dimer.

Obviously, many modifications and variations of the invention, as hereinbefore set forth, may be made without departing from the spirit and scope thereof, and therefore only such limitations should be imposed as are indicated in the appended claims.

I claim:

1. A method for preparing propylene dimers which comprises polymerizing propylene at a temperature in the range of 600 to 850° F. in the presence of a fatty acid having from 2 to 4 carbon atoms and a silica-magnesia catalyst, the molar proportions of said propylene to said fatty acid being in the range of 10:1 to 1:1, and said catalyst consisting of silica and magnesia with proportions in the range of 7:1 to 2:1 respectively.

2. A method according to claim 1 in which said fatty acid is acetic acid.

3. A method for preparing propylene dimers which comprises polymerizing propylene at a temperature in the range from 600 to 850° F. in the presence of acetic acid and a silica-magnesia catalyst, the molar proportions of said propylene to acetic acid being in the range of 4:1 to 3:2, and said catalyst consisting of silica and magnesia with proportions in the range of 5:1 to 3:1 respectively.

References Cited in the file of this patent

UNITED STATES PATENTS 2,418,028    Haensel _____ Mar. 25, 1947